US011449655B2

(12) United States Patent
Cherif et al.

(10) Patent No.: US 11,449,655 B2
(45) Date of Patent: Sep. 20, 2022

(54) SYNTHESIS OF A NETWORK-ON-CHIP (NOC) USING PERFORMANCE CONSTRAINTS AND OBJECTIVES

(71) Applicant: ARTERIS, INC., Campbell, CA (US)

(72) Inventors: Moez Cherif, Santa Cruz, CA (US); Benoit De Lescure, Campbell, CA (US)

(73) Assignee: ARTERIS, INC., Campbell, CA (US)

( * ) Notice: Subject to any disclaimer, the term of this patent is extended or adjusted under 35 U.S.C. 154(b) by 22 days.

(21) Appl. No.: 17/138,839

(22) Filed: Dec. 30, 2020

(65) Prior Publication Data

US 2022/0210030 A1 Jun. 30, 2022

(51) Int. Cl.
*G06F 30/30* (2020.01)
*G06F 30/327* (2020.01)
*G06F 115/02* (2020.01)
*G06F 115/08* (2020.01)

(52) U.S. Cl.
CPC ........ *G06F 30/327* (2020.01); *G06F 2115/02* (2020.01); *G06F 2115/08* (2020.01)

(58) Field of Classification Search
None
See application file for complete search history.

(56) References Cited

U.S. PATENT DOCUMENTS

| | | | |
|---|---|---|---|
| 5,983,277 A | 11/1999 | Heile et al. | |
| 6,134,705 A | 10/2000 | Pedersen et al. | |
| 6,437,804 B1 | 8/2002 | Ibe et al. | |
| 9,569,574 B1 | 2/2017 | Khan et al. | |
| 10,068,047 B1 | 9/2018 | Finn | |
| 10,282,502 B1 | 5/2019 | BShara et al. | |
| 10,348,563 B2 * | 7/2019 | Rao | G06F 15/7825 |
| 10,990,724 B1 | 4/2021 | Cherif et al. | |
| 11,121,933 B2 | 9/2021 | Cherif et al. | |
| 2003/0093765 A1 | 5/2003 | Lam et al. | |
| 2007/0157131 A1 | 7/2007 | Watanabe et al. | |

(Continued)

FOREIGN PATENT DOCUMENTS

| | | |
|---|---|---|
| CN | 109587081 A | 4/2019 |
| CN | 113051215 A | 6/2021 |
| DE | 102015014851 A1 | 5/2016 |

OTHER PUBLICATIONS

K. R. Manik et al., "Methodology for Design of Optimum NOC Based on IPG," 2017 Int'l Conference on Algorithms, Methodology, Model and Applications in Emerging Technologies (ICAMMAET), Chennai, India, IEEE, 6 pages. (Year: 2017).*

(Continued)

*Primary Examiner* — Leigh M Garbowski
(74) *Attorney, Agent, or Firm* — Dana Legal Services; Jubin Dana

(57) ABSTRACT

Systems and methods are disclosed that implement a tool for executing performance-aware topology synthesis of a network, such as a network-on-chip (NoC). The tool is provided with network information. The tool uses the network information to automatically determine data width and clock speed for each element in the network that meet the network's constraints and performance requirements. The tool is able to provide the performance-aware topology synthesis rapidly, while honoring the objectives and the network's constraints.

17 Claims, 16 Drawing Sheets

(56) References Cited

U.S. PATENT DOCUMENTS

| | | |
|---|---|---|
| 2007/0174795 A1 | 7/2007 | Lavagno et al. |
| 2010/0218146 A1 | 8/2010 | Platzker et al. |
| 2014/0153575 A1 | 6/2014 | Munoz |
| 2015/0036536 A1 | 2/2015 | Kumar et al. |
| 2015/0347641 A1 | 12/2015 | Gristede et al. |
| 2016/0103943 A1 | 4/2016 | Xia et al. |
| 2018/0227180 A1 | 8/2018 | Rao et al. |
| 2020/0092230 A1 | 3/2020 | Schultz et al. |
| 2020/0162335 A1 | 5/2020 | Chen et al. |
| 2021/0203557 A1 | 7/2021 | Cherif et al. |

OTHER PUBLICATIONS

Alessandro Pinto et al: "System level design paradigms", ACM Transactions on Design Automation of Electronic Systems, ACM, New York, NY, US, vol. 11, No. 3, Jun. 7, 2004 (Jun. 7, 2004), pp. 537-563, XP058222500.

Bo Huang et al: "Application-Specific Network-on-Chip synthesis with topology-aware floorplanning", Integrated Circuits and Systems Design (SBCCI), 2012 25th Symposium on, IEEE, Aug. 30, 2012 (Aug. 30, 2012), pp. 1-6, XP032471227.

David Atienza et al, Network-on-Chip Design and Synthesis Outlook, Science Direct, Integration the VLSI, Journal 41 (2008) 340-359.

Jean-Jacques Lecler et al: Application driven network-on-chip architecture exploration& refinement for a complex SoC, Design Automation for Embedded Systems, vol. 15 No. 2, Apr. 7, 2011, DOI: 10.1007/S10617-011-9075-5.

Partha et al., Design, Synthesis, and Test of Networks on Chips, IEEE (Year: 2005).

Srinivasan K. et al: "Linear programming based techniques for synthesis of network-on-chip architectures", Computer Design: VLSI in Computers and Processors, 2004. ICCD 2004. Proceedings. IEEE International Conference on San Jose, CA, USA Oct. 11-13, 2004, Piscataway, NJ, USA, IEEE. Oct. 11, 2004 (Oct. 11, 2004), pp. 422-429, XP010736641.

Srinivasan Mural et al: "Mapping and physical planning of networks-on-chip architectures with quality-of-service guarantees", Proceedings of the 2005 Asia and South Pacific Design Automation Conference, Jan. 18, 2005, DOI: 10.1145/1120725.1120737.

Tobias Bjerregaard et al: "A Router Architecture for Connection—Oriented Service Guarantees in the MANGO Clockless Network-on-Chip", Proceedings of the IEEE Conference and Exhibition on Design, Automation, and Test in Europe, Mar. 7, 2005, DOI: 10.1109/DATE.2005.36.

Wei Zhong et al: "Floorplanning and Topology Synthesis for Application-Specific Network-on-Chips", IEICE Transactions on Fundamentals of Electronics< Communications and Computer Sciences, Jun. 1, 2013, DOI: 10.1587/TRANSFUN.E96.A.1174.

Zhou Rongrong et al: A Network Components Insertion Method for 3D Application-Specific Network-on-Chip, Proceedings of the 11th IEEE International Conference on ASIC, Nov. 3, 2015, pp. 1-4, DOI: 10.1109/ASICON.2015.7516952.

Luca Benini: "Application specific Noc design", Design, Automation and Test in Europe, 2006, Date '06 : Mar. 6-10, 2006, [Munich, Germany; Proceedings] / [Sponsored By the European Design and Automation Association], IEEE, Piscataway, NJ, USA, Mar. 6, 2006 (Mar. 6, 2006), pp. 491-495, XP058393584, ISBN: 9783981080100.

\* cited by examiner

Levelization and bucketization of the network nodes

Identifying all routes going through edge e9

Checking edge bandwidth BW9

SYNTHESIS OF A NETWORK-ON-CHIP (NOC) USING PERFORMANCE CONSTRAINTS AND OBJECTIVES

FIELD OF THE INVENTION

The present technology is in the field of system design and, more specifically, related to using performance constraints and objectives in topology synthesis of a network-on-chip (NoC).

BACKGROUND

Multiprocessor systems have been implemented in systems-on-chips (SoCs) that communicate through network-on-chips (NoCs). The SoCs include instances of master (initiators) intellectual properties (IPs) and slave (targets) IPs. Transactions are sent from a master to one or more slaves using industry-standard protocols. The master, connected to the NoC, sends a request transaction to a slave, using an address to select the slave. The NoC decodes the address and transports the request from the master to the slave. The slave handles the transaction and sends a response transaction, which is transported back by the NoC to the master.

The design and implementation of the NoC can be achieved by a user (designer) or it can be automatically provided to the user by a topology synthesis tool. Regardless of how the design and implementation are achieved, performance and performance constraints are considered throughout the design (and topology synthesis) process. One known approach is when the NoC is created by users (human). The user must choose the NoC elements, their data width, and to what clock source the NoC elements shall be connected. Given current complexity of systems, this approach is a very complex and tedious task for the user to perform.

Another known approach is when the network is created by a topology synthesis tool that uses a topology synthesis algorithm to compute, for the generated network elements, the desired data width and the clock, to which the elements are connected. As such, the tool may find a different solution every time it runs using slightly different constraints. If the tool generates substantially different results each time, then this will lead to the designer having to spend a great deal of time in design confirming implementation work already done. This process cannot, efficiently and with a high degree of accuracy, be performed by the user manually. Therefore, what is needed is a tool to derive a data width and select a clock source for every element of the NoC automatically.

SUMMARY OF THE INVENTION

In accordance with various embodiments and aspects of the invention, systems and methods are provided for a topology synthesis tool that generates a network, such as a network-on-chip (NoC) that derives the data width and selects the clock source for every element of the NoC. The tool implements a performance-aware topology synthesis that includes using definitions of network elements in the network that have well-defined performance parameters, such as data width and clock frequency requirements. One advantage of the invention is that the tool executes a process and produces a feasible network that considers performance constraints and objectives throughout the topology synthesis process.

BRIEF DESCRIPTION OF THE DRAWINGS

In order to understand the invention more fully, reference is made to the accompanying drawings. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and embodiments and the presently understood best mode of the invention are described with additional detail through use of the accompanying drawings.

DETAILED DESCRIPTION

Figure 1:
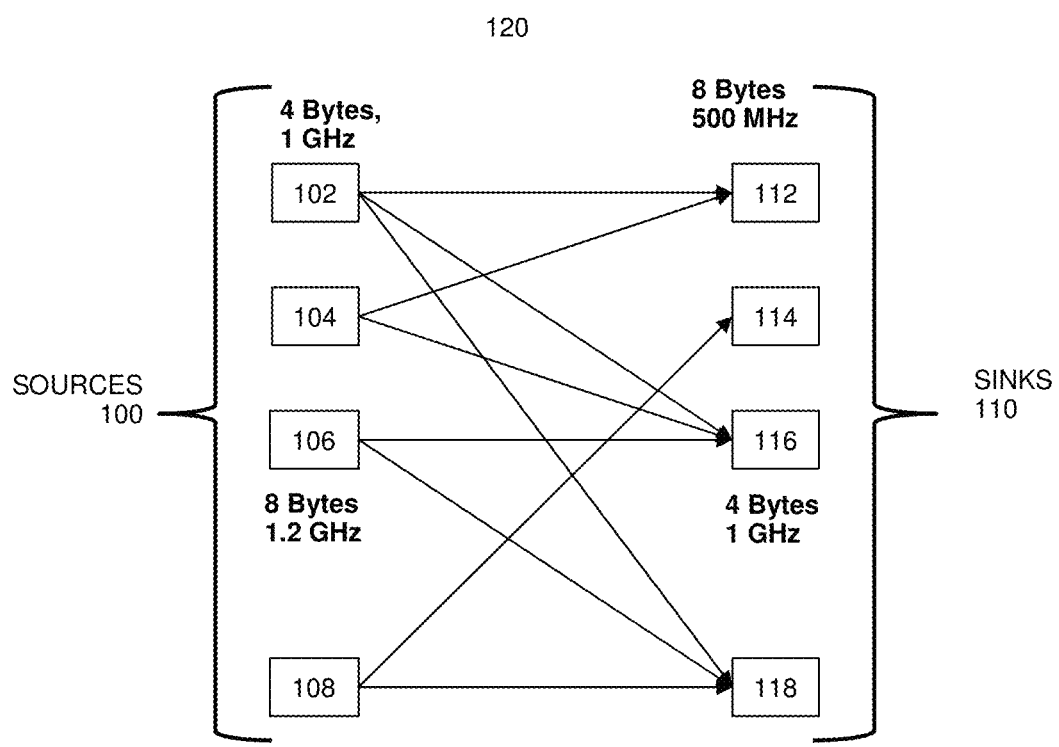
FIG. 1 shows connectivity map, between sources and sinks through a network in accordance with the aspects and embodiments of the invention.

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one embodiment," "an embodiment," "certain embodiment," "various embodiments," or similar language means that a particular aspect, feature, structure, or characteristic described in connection with the embodiment is included in at least one embodiment of the invention.

As used herein, a "source", a "master", and an "initiator" refer to similar intellectual property (IP) modules or units and the terms are used interchangeably within the scope and embodiments of the invention. As used herein, a "sink", a "slave", and a "target" refer to similar IP modules or units and the terms are used interchangeably within the scope and embodiments of the invention. As used herein, a transaction may be a request transaction or a response transaction. Examples of request transactions include write request and read request.

Thus, appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting principles, aspects, and embodiments of the invention are intended to encompass both structural and functional equivalents thereof. It is intended that such equivalents include both currently known equivalents and equivalents developed in the future. Furthermore, to the extent that the terms "including", "includes", "having", "has", "with", or variants thereof are used in either the detailed description and the claims, such terms are intended to be inclusive in a similar manner to the term "comprising."

In accordance with the aspects and embodiments of the invention, a tool creates the NoC by connecting configurable elements (switches, pipelines, buffers, adapters, etc.) based on a set of rules and a set of constraints. The tool takes into consideration the data width of element. The tool takes into consideration the clock source for each element. Elements that are paired (source, sink) for communication and connected for communication through a network are configured with a data width and a clock source.

When paired elements (source, sink) are considered, the maximum achievable bandwidth between the paired elements is based on traffic between the paired elements (source, sink) being the only traffic through the network. Stated a different way, if the traffic between the paired elements (source, sink) is the only traffic in the network, then the maximum achievable bandwidth between the paired elements (source, sink) is the minimum of the source's bandwidth and the sink's bandwidth, which is carried by the network for communication between the paired elements (source, sink). As used herein, bandwidth (measured in bits per second) is based on the data width and the clock frequency of an element.

Referring now to FIG. 1, a connectivity map for sources 100 and sinks 110 is shown in accordance with the various aspects and embodiments of the invention, each of the sources 100 and the sinks 110 have a data width and a clock frequency. Stated in a different way, every source has a data width specified for it and a clock bound to it. Also, every sink has a data width defined for it and a clock bound to it. Every clock has a frequency defined. Additionally, data width defined at the sources and the sinks is independent of the connectivity map and the scope of the invention is not limited by the connectivity mapping. For example, source 102 is connected to sinks 112, 116, and 118 which have similar or different data width.

In accordance with the various aspects and embodiments of the invention, bandwidth is computed at a source that defines the maximal bandwidth, which an outward connection can carry. In accordance with the various aspects and embodiments of the invention, bandwidth is computed at a sink that defines the maximal bandwidth, which an inward connection carries. For example, source 102 and sink 116 have a clock rate of 1 GHz and data width of 4 bytes. Source 106 has a clock frequency of 1.2 GHz and data width of 8 bytes. Sink 116 has a clock frequency of 1 GHz and a data width of 4 bytes.

Figure 2:
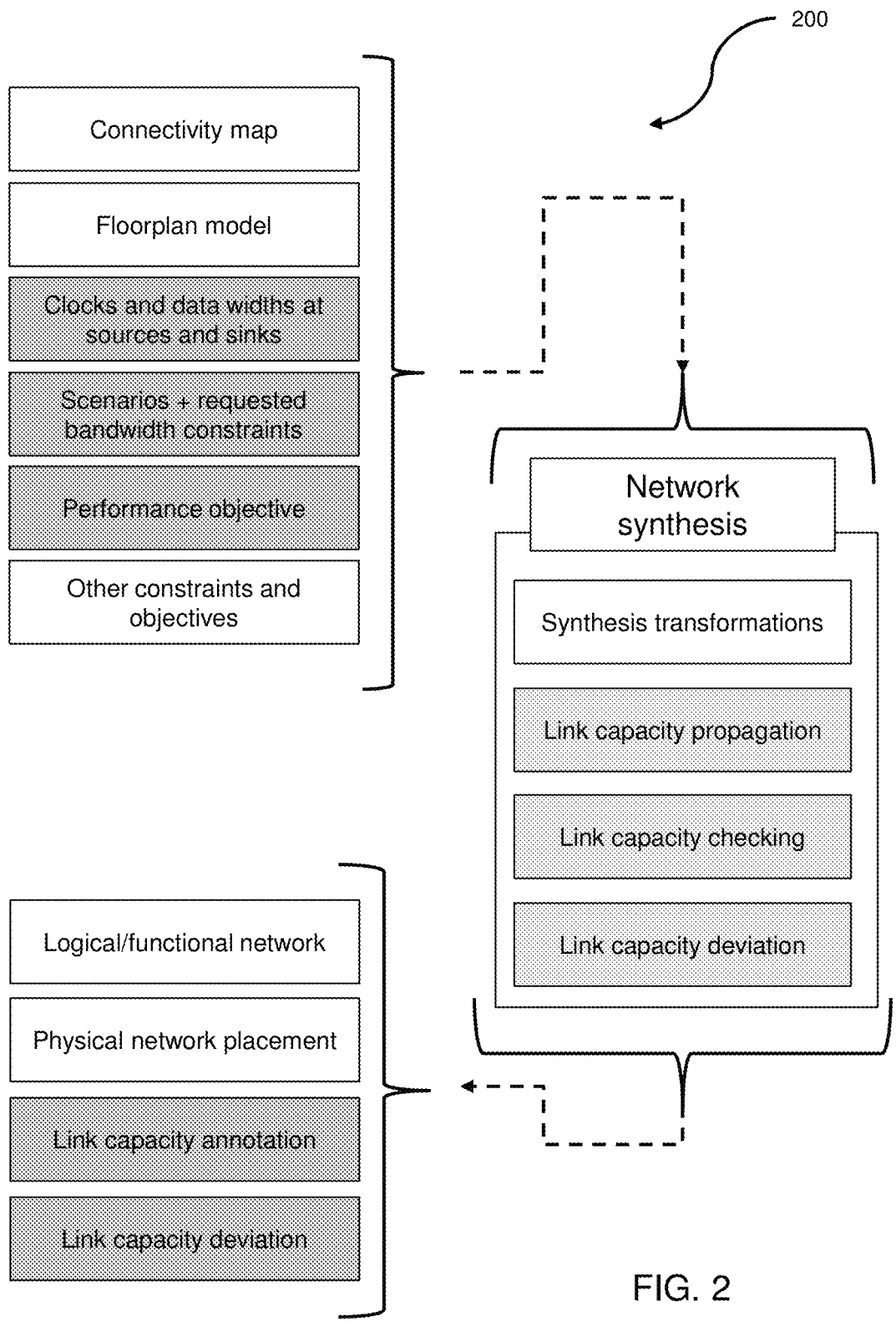
FIG. 2 shows a flow process executed by a tool that synthesizes the topology of a network in accordance with the aspects and embodiments of the invention.

Referring now to FIG. 2, a NoC topology synthesis process 200 that is executed by a tool is shown with steps that are followed in accordance with the various aspects and embodiments of the invention. The process 200 receives, from a user, as inputs network information and parameters, including: connectivity map, floorplan information to model, and other constraints and performance objectives. The process 200 also received parameters that include: clock speeds for all clocks signals available to sources and sinks; data width at all sources and sinks; usage scenarios for the various connections; requested bandwidth constraints; and performance objectives. The parameters are inputted to the tool that uses the process 200 by the user (designer) of the network.

In accordance with the various aspects and embodiments of the invention, the process 200 implements an algorithm that will, simultaneously, derive a data width and choose a clock source for every elements of the network. These parameters are chosen using defined (and non-modifiable) data width and use a defined clock source for the sources and the sinks. The information is inputted to the tool executing the process 200. In accordance with the various aspects and embodiments of the invention, all clock sources are available for connection to any element of the network for the purpose of matching to a clock frequency identified or defined for an element.

The tool executed the process 200 so as to guarantee, for any given pair (source, sink) with traffic through the network, that the maximum achievable bandwidth between the pair can be carried by the network. The maximum achievable bandwidth is determined to be the minimum of the source maximum bandwidth and the sink maximum bandwidth. Once the maximum achievable bandwidth is chosen, then data width and clock source for all network elements related to the route for the pair (source, sink) determines a network bandwidth capacity at any point of the network for the route between the pair (source, sink).

In accordance with the various aspects and embodiments of the invention, the process 200, implementing an algorithm, performs network topology synthesis based on the user defined parameters. The network topology synthesis includes the following: topology synthesis transformations, link capacity propagation, link capacity checking, and link capacity deviation, which are explained in greater detail herein. The output of the network synthesis step produces logical and functional network description, physical placement of the network elements, link capacity annotation, and link capacity deviation, which are explained herein.

In accordance with some aspects and embodiments of the invention, the process uses rules for automatic propagation of data width throughout the network elements. If the data width for either the ingress ports or the egress ports of an element are unknown, then a value of 0 is assigned in the following equation for the MAX functions. In other words, that value is ignored in the propagation, unless all ingresses or egresses are undefined; I which case the value is 0. The process uses the following rule and assigns the data width to an element as follows:

MIN (MAX(data width of ingress ports), MAX(data width all egress ports))

In accordance with some aspects and embodiments of the invention, the process uses rules for automatic propagation of clock connections (frequency) to network elements. If the clock frequency for either the ingress ports or the egress ports is unknown, then a value of 0 is assigned in the following equation for the MAX functions. The process uses the following rule and assigns the clock to an element based on clock frequency as follows:

MIN (MAX(clock frequency of ingress ports), MAX (clock frequency all egress ports))

Figure 3:
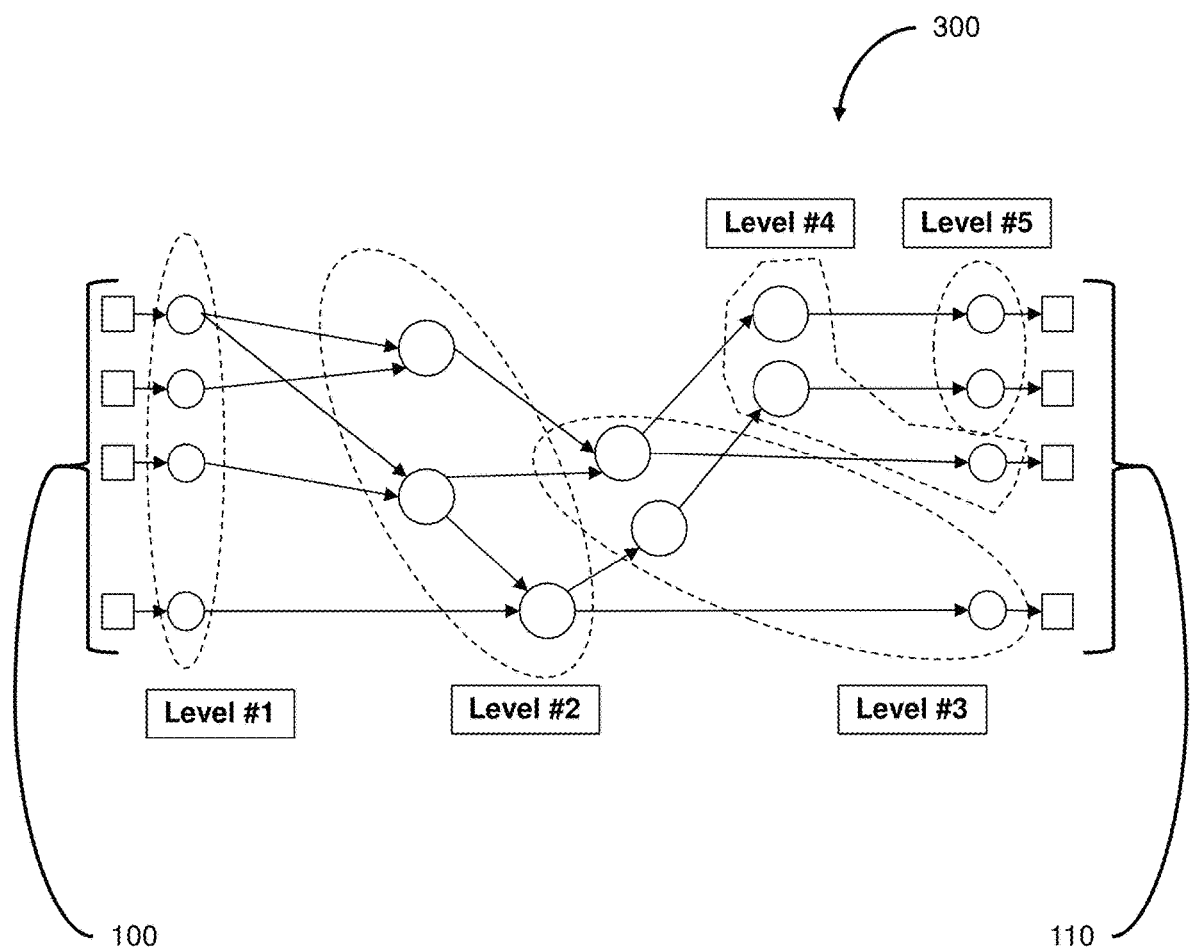
FIG. 3 shows a network with connectivity and grouping of elements into levels in accordance with the aspects and embodiments of the invention.

As noted, the topology synthesis process includes creation of links in the network as related to link capacity computations that includes link capacity propagation, link capacity checking, and link capacity deviation. Referring now to FIG. 3, a connectivity map 300 is shown for data propagation through network elements (edges and nodes) for all routes (through a network) connecting sources 100 to sinks 110 (as presented in FIG. 1) in accordance with some aspects and embodiments of the invention. The map 300 shows the nodes (circles) of the network to be synthesized. The synthesis considers the nodes, links between nodes, and the link capacity. Each node includes information about its data width and clock frequency for the propagation through the network for each (source, sink) pairing.

In accordance with various aspects and embodiments of the invention, the topology synthesis process applies forward and backward propagation back-to-back until the annotation is stabilized. The annotation is stable when no data width and no clock frequency, of any node, keeps on changing between passes. The topology synthesis process partitions the network nodes into disjoint buckets, such that all nodes within a bucket are of the same level (i.e., depth in the network along the route) or distance to the closest source along the propagation path of the data. For the non-limiting example shown, starting from the sources 100, data widths and clock frequencies are grouped into buckets, level-by-level (from left to right) and until the sinks 110 are reached. Thus, the first set of nodes, starting from the sources 100, are placed in a bucket and labelled level #1. The process continues to generate the buckets and different levels, such as buckets for level #2, level #3, level #4, and level #5. This produces a forward propagated annotated network. When all levels are traversed and all sinks are reached, backward propagation is performed in a similar way by propagating through the network, for data width and clock speeds, from the sinks 110, through the nodes of the network, to the sources 100. The backward propagation uses the annotated map 300, generated by previous passes (i.e., forward propagation).

Figure 4A:
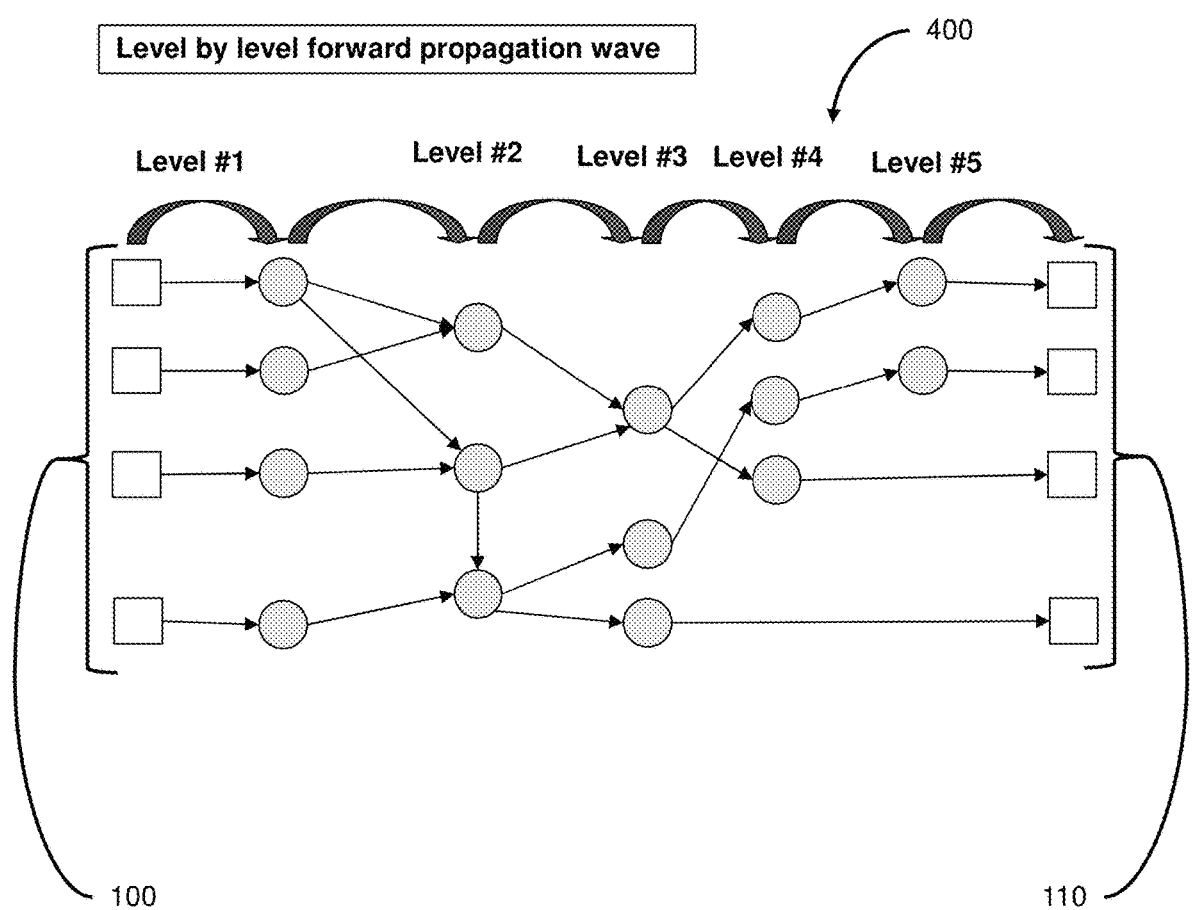
FIG. 4A shows an initial step of a topology synthesis process through the network in accordance with the aspects and embodiments of the invention.
Figure 4B:
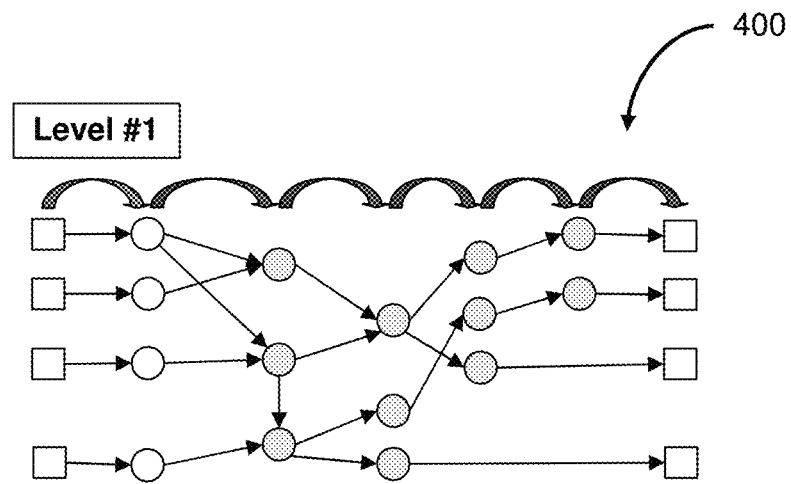
FIG. 4B shows another step of a topology synthesis process through the network in accordance with the aspects and embodiments of the invention.
Figure 4C:
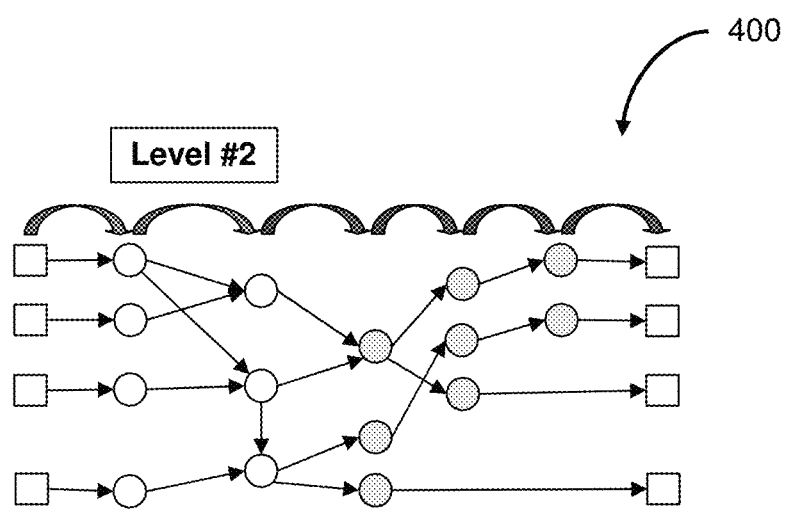
FIG. 4C shows another step of a topology synthesis process through the network in accordance with the aspects and embodiments of the invention.
Figure 4D:
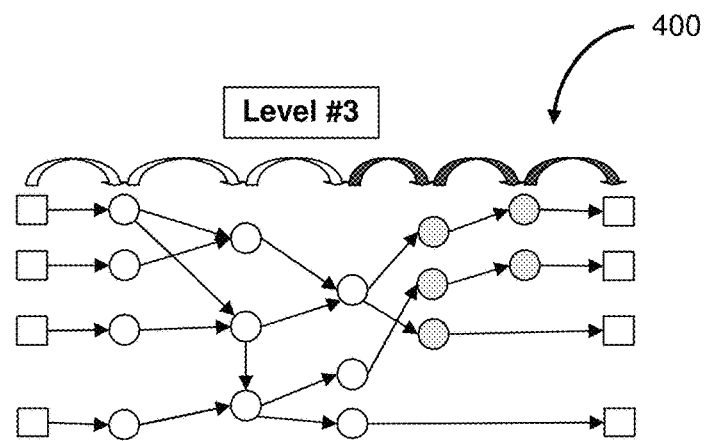
FIG. 4D shows another step of a topology synthesis process through the network in accordance with the aspects and embodiments of the invention.
Figure 4E:
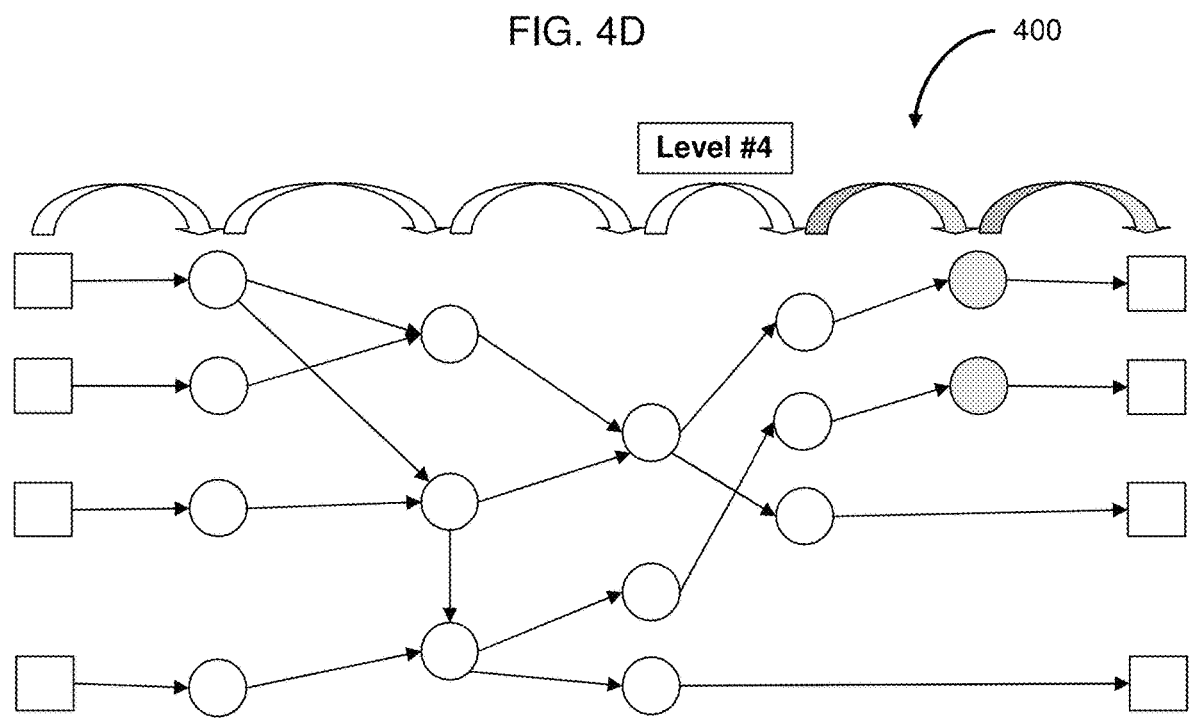
FIG. 4E shows another step of a topology synthesis process through the network in accordance with the aspects and embodiments of the invention.
Figure 4F:
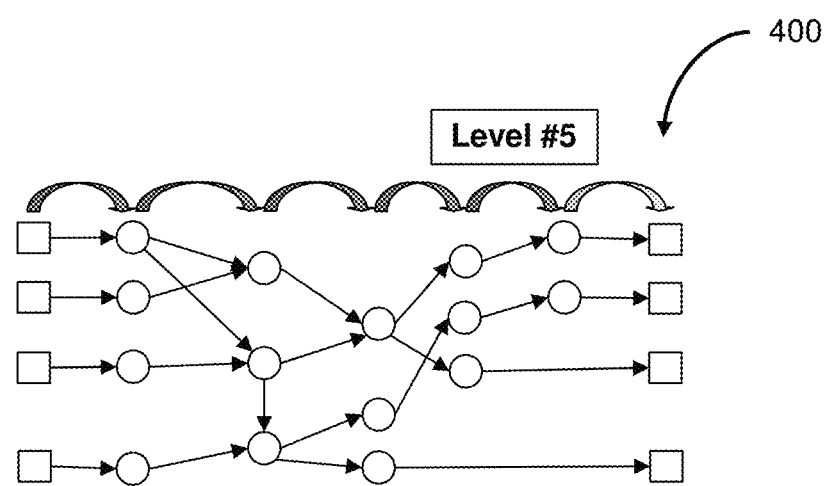
FIG. 4F shows another step of a topology synthesis process through the network in accordance with the aspects and embodiments of the invention.

Referring now to FIG. 4A through FIG. 4F, a network 400 is shown that summarizes the data width propagation rule at various stages (for any given node at any given level) during the forward pass from sources 100 to sinks 110 through nodes of the network, such as a NoC. The process determines the link capacity through the network along paths or routes for (source, sink) pairs. FIG. 4A starts at the sources 100 and shown the propagation through the levels to the sinks 110. FIG. 4B shows link capacity computations when propagation from the sources 100 to level #1. FIG. 4C shows link capacity computations when propagation from level #1 to level #2. FIG. 4D shows link capacity computations when propagation from level #2 to level #3. FIG. 4E shows link capacity computations when propagation from level #3 to level #4. FIG. 4F shows link capacity computations when propagation from level #5 to level #5.

Figure 5:
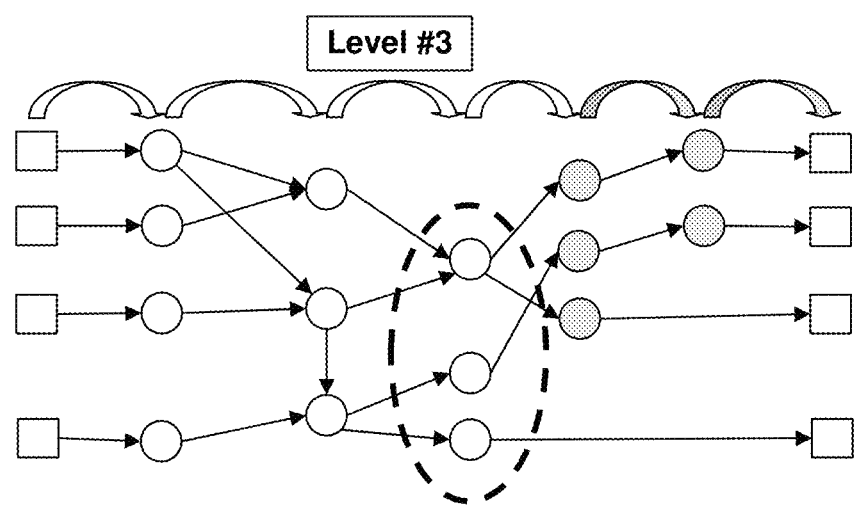
FIG. 5 shows a topology synthesis process at one level of the network in accordance with the aspects and embodiments of the invention.
Figure 6A:
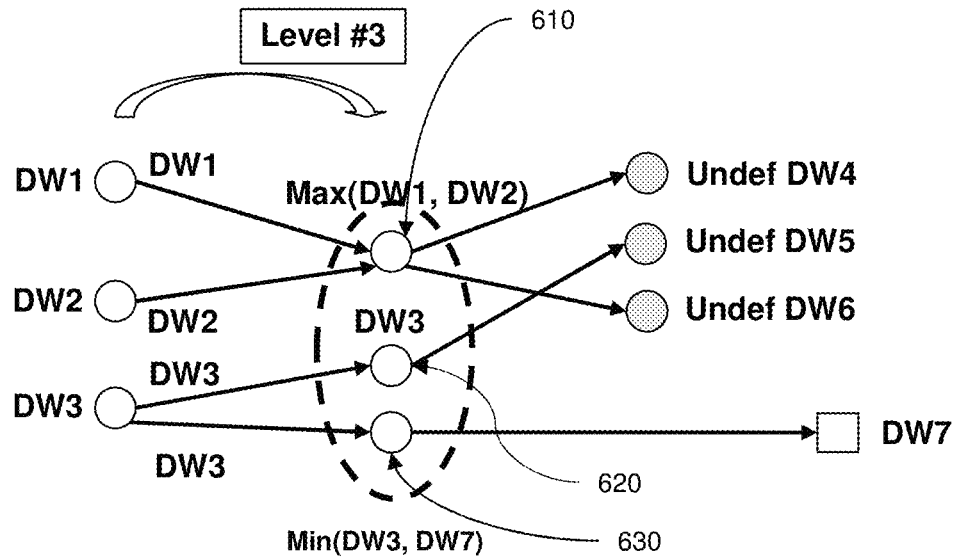
FIG. 6A shows one pass in the topology synthesis process of FIG. 5 in accordance with the aspects and embodiments of the invention.
Figure 6B:
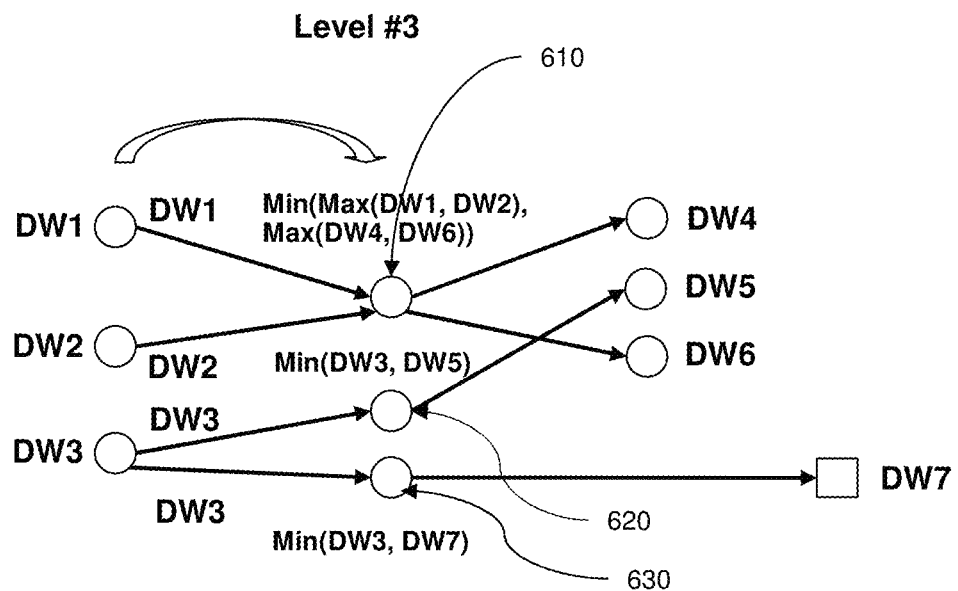
FIG. 6B shows a different pass in the topology synthesis process of FIG. 5 in accordance with the aspects and embodiments of the invention.

Referring now to FIG. 5, FIG. 6A, and FIG. 6B, the process of forward propagation for stabilizing and annotating the network is shown in accordance with the various aspects and embodiments of the invention. In this example, level 3 is used as an example for data width calculation. The process applies to all levels, even though only level 3 is discussed herein for clarity. Level 3 includes three nodes, each have a data width on the ingress and egress side, for a first pass of propagation from level 2 to level 3. Each node in the bucket at level 3 includes a data width (DW) on the ingress side and the egress side. Using the rule MIN (MAX (data width ingress ports), MAX(data width egress ports)) for node 610, the result is MIN (MAX(DW1, DW2), MAX (undef DW4, undef DW6)). Where the data width is undefined, a value of 0 is assigned. Thus, the result for node 610 is MAX(DW1, DW2). Similar calculations for node 620 and 630 result in the data widths as follows: for node 620 it is DW3 and for node 630 it is MIN(DW3, DW7). Having completed a first pass of forward propagation, other back-to-back forward and backward passes are performed until the data width is stabilized.

In accordance with various aspects and embodiments of the invention, an arbitrary pass is shown in FIG. 6B. This arbitrary selected pass, which is selected from any number of the possible passes that follow the first pass, is used as an example and not a limit to the scope of the invention. Again the process applies the rule MIN (MAX(data width of ingress ports), MAX(data width all egress ports)). This time the egress port data width are know from a previous pass. The process applied the rule MIN (MAX(data width ingress ports), MAX(data width egress ports)) to node 610. The result is MIN (MAX(DW1, DW2), MAX(DW4, DW6)). Similar calculations for node 620 and 630 result in the data widths as follows: for node 620 it is MIN(DW3, DW5) and for node 630 it is MIN(DW3, DW7).

Figure 7:
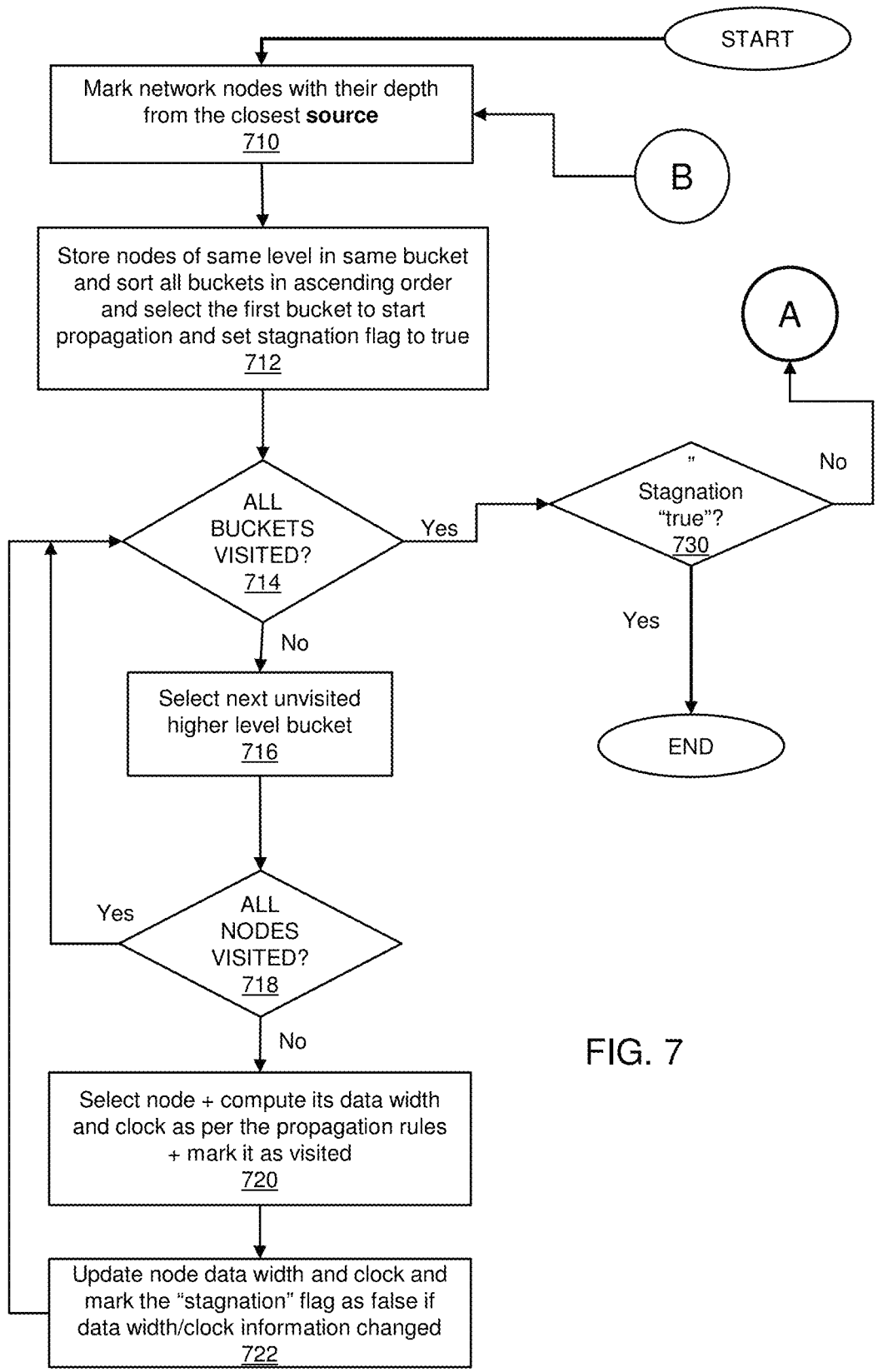
FIG. 7 shows a flow process for determining data width and clock when performing forward propagation (request network) of the topology synthesis process in accordance with the aspects and embodiments of the invention.

Referring now to FIG. 7, a process for determining data width and clock, using forward propagation analysis through all the nodes and edges (elements), in the network, is shown in accordance with the aspects and embodiments of the invention. The process start at step 710. At step 710 all nodes in the network are marked or identified with respect to the source closest to the node. This information is used to organize the nodes into levels. At step 712 nodes of the same level are assigned to and stored in a bucket. The buckets are sorted in ascending order based on proximity to the source. The initial or first bucket at the first level is selected. The stagnation flag is set to true. As discussed herein, the stagnation flag may be represented by a stagnation flag value through using a single bit, wherein "1" is true and "0" is false, in accordance with one aspect and embodiment of the invention. The first level with the bucket of nodes is analyzed. At step 714, the process determines if all the bucket at the different levels are visited and analyzed. If not, the process continues to step 716. At step 716, the next bucket that has not been visited, which is at the next numerically higher level, is selected. The bucket is visited and analyzed.

At step 718, the process determines if all the nodes, which are at the same level bucket (the same level), have been visited and analyzed in terms of data width and clock speed. If so, then the process continues to step 714. If not, then the process continues to step 720, where the unvisited nodes are analyzed. The computation is performed for the node using the rules. In accordance with the aspects and embodiments of the invention, each node includes a visit flag that is used to indicated if the node has been visited and analyzed. After the computation is performed for the node, then the node's visit flag is marked as visited.

The tool updates a stagnation flag with a stagnation flag value during the propagation from level to level, in forward and backward propagation. The tool checks the stagnation flag. in some embodiments at the of propagation through each level and in some embodiments at the end of a full (forward or backward) propagation and in some embodiments at the end of each level and at the end of full propagation through all levels, example of which are discussed herein. In accordance with some embodiments, stagnation flag value of a stagnation flag is reset to "true" at the beginning of every propagation phase.

In accordance with the some aspects and embodiments of the invention, a local stagnation flag, which may be at each node or for each level, tracks the stability of the topology synthesis for each node. For the example of a local stagnation flag, the flag starts with a stagnation flag value of "true." Every time the tool processes a node, during the forward or backward propagation, the topology synthesis tool updates the flag. If a node's data width/clock information changes, then the flag is updated; it is changed to a "false" value. At the end of the propagation (forward or backward) for any given level (or, in accordance with some aspects, after all levels are analyzed) when all nodes have been visited, the tool checks the flag. If the value of all flags is "true," then no node has been updated during the propagation process. This means that the topology synthesis of the network is stagnant (stable) and the tool completes (stops) the propagation process. If any stagnation flag value is "false," then there have been a change or an update to the data width/clock for that node.

In accordance some aspects and embodiments of the invention, a global stagnation flag is used to track the stability of the topology synthesis for the overall network. For the example of a global stagnation flag, the flag starts with a stagnation flag value of "true." Every time the tool processes a node, during the forward or backward propagation, the topology synthesis tool updates the flag. If a node's data width/clock information changes, then the flag is updated and changed to a "false" value. At the end of the propagation (forward or backward), when all nodes have been visited, the tool checks the flag. If the stagnation flag value is "true," then no node has been updated during the propagation process. This means that the topology synthesis of the network if stable and the tool completes (stops) the propagation process.

At step 722, the data or information for the node is updated based on the results to set the data width and clock speed (DW/clock) for the node. Considering the example of a global stagnation flag, once the data width and clock for the node is determined, the stagnation flag value can be determined. The stagnation flag is set to false if the data width/clock information for the node changes as a result of being visited. As long as the parameters for the node do not change, the stagnation flag remains unchanged and the stagnation flag value remain "true". On the other hand, if there is a pass through a bucket level and the performance data (data width and clock) for any node changes, then the stagnation flag is updated and the stagnation flag value is changed to true.

In accordance with some aspects of the invention, the stagnation flag is checked as the process continued to determine if the most recently calculated data width and clock have caused changes to any node's DW/clock value; the stagnation flag is updated when calculated data causes changes to DW/clock as the tool processes and visits new levels and more nodes. Changes to performance data, which is for previously visited nodes. resulting from visiting new (previously unvisited) nodes and levels are tracked by changing or updating the stagnation flag. As outlined herein, the determined information (performance data) for an already visited node can change as new nodes, at different levels, are visited and analyzed.

If at step 718 all nodes are visited and at step 714 all level buckets are visited, then the process continues to step 730 to determine if stagnation flag has changed. IF the process determines that the stagnation flag value is true, then the process ends because stagnation has occurred and the topology synthesis of the network is stable. On the other hand, stagnation does not occur and is invalidated if, during calculation of data width and clock speed for each node, the resulting calculation changed or becomes outdated. The change is identified and tracked as a change in the stagnation flag so that the stagnation flag value is false. Stated a different way, if the calculated information has changed for any node (DW/clock), then the stagnation flag is changed from true to false (in one example, this is a changed bit). If at step 730 the process determines that there is no stagnation, which means that the stagnation flags are all false, then the process proceeds to the backward propagation shown in FIG. 8. On the other hand, if at step 730 the process determines that there was stagnation and the stagnation flag value is "true" then the process ends.

Figure 8:
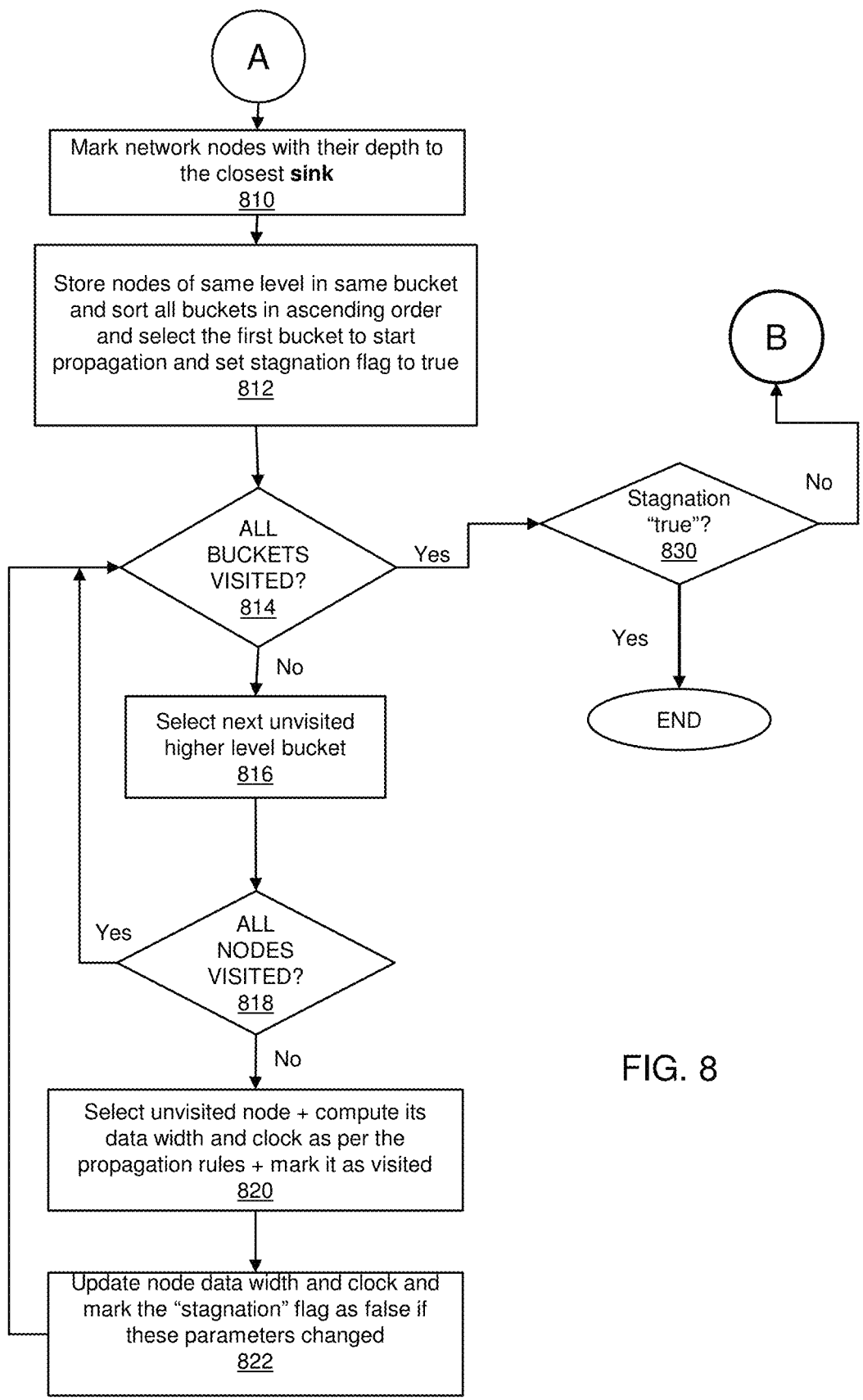
FIG. 8 shows a process for determining data width and clock when performing backward propagation (response network) of the topology synthesis process in accordance with the aspects and embodiments of the invention.

Referring now to FIG. 8, a process for determining data width and clock, using backward propagation analysis through all the nodes and edges (elements) in the network is shown in accordance with the aspects and embodiments of the invention. The process start at step 810. At step 810 all nodes in the network are marked or identified with respect to the sink closest to the node. This information is used to organize the nodes into levels. At step 812 nodes of the same level are assigned to and stored in a bucket. The buckets are sorted in ascending order based on proximity to the sink. The initial or first bucket at the first level, which is closest to the sink, is selected for analysis and calculation. The stagnation flag value, for the stagnation flag, is set to "true." The first level bucket of nodes is analyzed. At step 814, the process determines if all buckets, which are at different levels, are visited and analyzed. If not, the process continues to step 816. At step 816, the next bucket that has not been visited, which is at the next numerically higher level, is selected. The bucket is visited and analyzed.

At step 818, the process determines if all the nodes, which are in the same level bucket, have been visited and analyzed in terms of data width and clock speed. If so, then the process continues and returns to step 814. If not, then the process continues to step 820, where the unvisited nodes are selected. The computation is performed for the node using the rules. The node is marked as visited.

At step 822, the data or information resulting from the calculation (for the node being analyzed) is updated. The data or information is stored for the node; this sets the node's data width and clock speed (DW/clock). Once the data width and clock for the node is determined, a stagnation flag can be updated as outlined above with respect to FIG. 7 keeping in mind that either a global stagnation flag or a local stagnation flag or both may be used. The "true" value for the stagnation flag is an indication that the node's data has not changed. Stated another way, the node is stable. As long as the parameters for the node do not change, the stagnation flag remains unchanged. In accordance with the aspects and embodiments of the invention, the stagnation flag is a value bit that is represented by "1" or "0" for the purpose of indicating "true" or "false." The stagnation flag is checked for all nodes as the process continued (propagates) to see if the calculated data width and clock have changed as the process visits new levels and nodes. As outlined herein, the determined information for a node can change as new nodes, at different levels are visited and analyzed.

If at step 818 the process determines that all nodes are visited and at step 814 all level buckets have been visited, then the process continues to step 830 to determine if stagnation has occurred at any node during the propagation from the lowest level bucket to the highest level bucket. Stagnation occurs if, during calculation of data width and clock speed for each node, the resulting calculation for DW/clock for each nodes does not change. If there is a change (in any nodes DW/clock), then the change is identified and tracked as a change in the stagnation flag's value being changed to "false." If the calculated information has changed, then the stagnation flag is changed to false (in one example, this is a changed bit). If there is no stagnation, which means that the stagnation flag is false, then the process proceeds to the forward propagation of FIG. 7. If at step 830, there is stagnation (stagnation flag value is "true"), this means that the calculations for all nodes is stagnant (or stable) and the process ends. If there was a change in value, then the stagnation flag (for the changing node) is changed from true to false. As stated, if at step 830, the process determines that there is stagnation flag's value is "true," then the process ends.

In accordance with some aspects and embodiments of the invention, a network is using dedicated path for every (source, sink) pair. The algorithm computes the elements' data width and clock source and can guarantee any kind of bandwidth requirement will be met, by design of the previous algorithm.

In accordance with some aspects and embodiments of the invention, the network does not dedicate a path to every (source, sink) pair. As such, the process of network synthesis will work to combine network resources to minimize the amount of wires and logic in the network. The combination transformations, using node and edge clustering, are bandwidth performance-aware to control optimization to ensure that required bandwidth is always supported and clustering is not performed if the resulting clustering can no longer support the bandwidth requirement.

Figure 9:
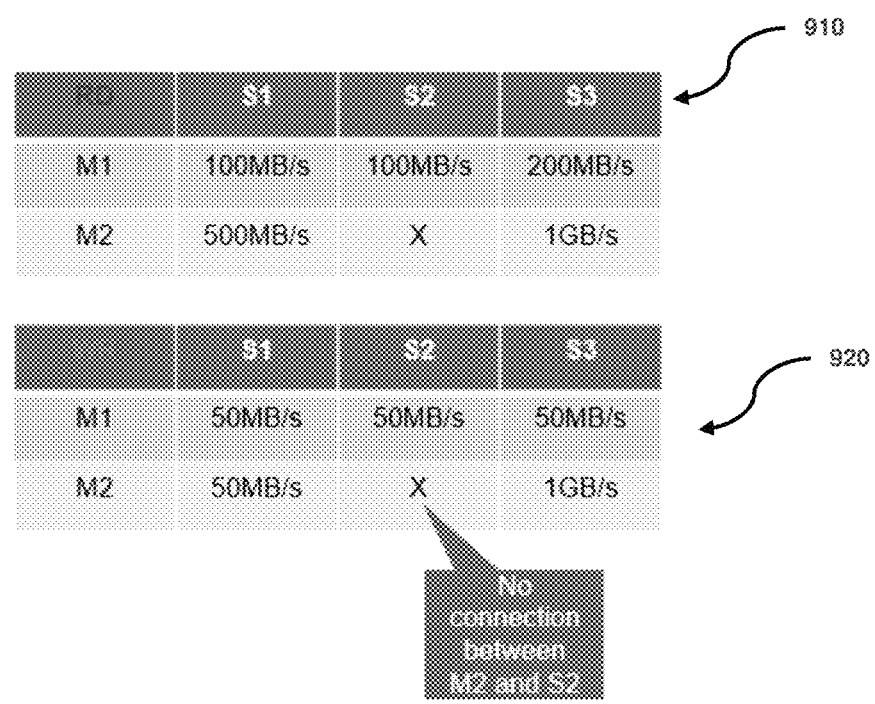
FIG. 9 shows matrices for bandwidth constraints or requirements in a request network in accordance with the aspects and embodiments of the system.

Referring now to FIG. 9, two tables or matrices are shown. Matrix 910 set forth bandwidth requirements for a read (request and response) transaction in the network, in accordance with one aspect and embodiment of the invention. Matrix 920 set forth bandwidth requirements for a write (request and response) transaction through the network, in accordance with one aspect and embodiment of the invention. As used herein, a "scenario" is the superposition of two different 2D matrices, one for reads and one for writes, such as matrix 910 and matrix 920. Each matrix includes information or data about sources and sinks; there is a column for every sink and a row for every source. Then for each (source, sink) pair there is a bandwidth value that is a number corresponding to the requirements or constraint for that pair. For example, in matrix 910, the bandwidth requirement is 100 MB/sec for the (S1, M1) pair. For entries in the table that have no connection, then there is no value indicated. Overall network performance based on bandwidth constraint are represented by the entries in the matrix and the network needs to support all scenarios, even though only one scenario may be operational at any one time. The user input includes or defines the user intent, such as a set of possible scenarios for the bandwidth capacity, at various points in the network or for the overall network. The scope of the invention is not limited by the number of scenarios, which is arbitrary.

Figure 10A:
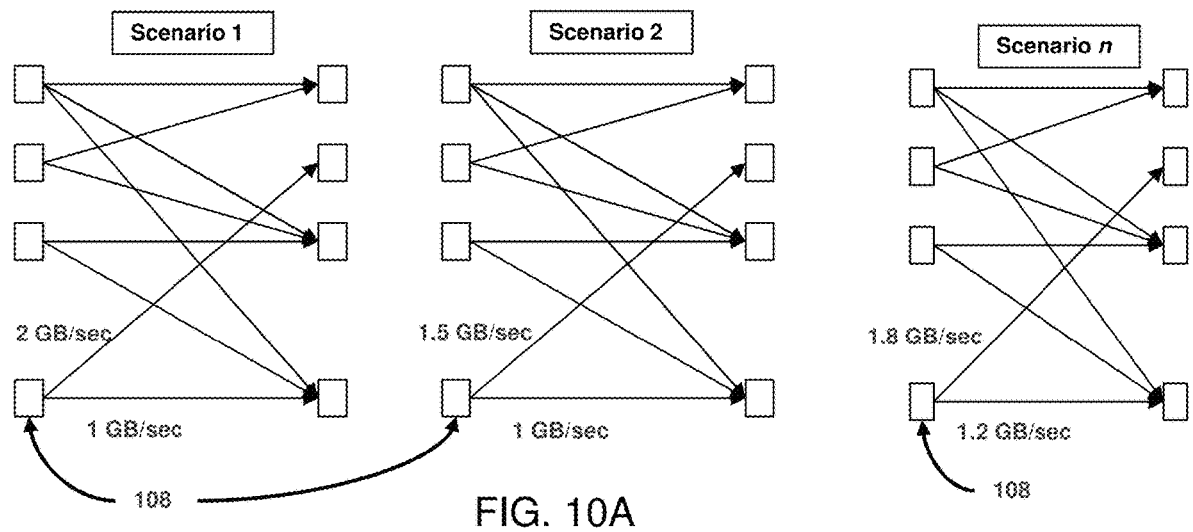
FIG. 10A shows a bandwidth constraint determination for various scenarios in a request network in accordance with the aspects and embodiments of the system.

Referring now to FIG. 10A, three different bandwidth scenarios are shown for the request network. Each path for a pair (source, sink) in the request network has a bandwidth constraint. For example and for simplicity and clarity, source 108 is selected and discussed. In scenario 1, source 108 is in communication with two sinks. In scenario 1, source 108 has a 2 GB/sec bandwidth constraint for one of its (source, sink) pairs and a 1 GB/sec constraint for another one of its (source, sink) pairs. In scenario 2, source 108 has a 1.5 GB/sec bandwidth constraint for one of its (source, sink) pairs and a 1 GB/sec constraint for another one of its (source, sink) pairs. In scenario n, source 108 has a 1.8 GB/sec bandwidth constraint for one of its (source, sink) pairs and a 1.2 GB/sec constraint for another one of its (source, sink) pairs. connected to the source. The process needs to determine the user's intent in terms of the required bandwidth as described in the possible scenarios, for any number of (source, sink) pairs. Thus, for an arbitrary number of use cases, the algorithm takes the constraints (bandwidth requirement) into account during network optimization transformations, such as node and edge clustering. The process uses the algorithm to ensure the network's bandwidth capacity meets the required bandwidth at every point of the network. In accordance with one aspect and embodiment of the invention, the resulting optimization meets exactly the required bandwidth capacity of the network and at every point. In accordance with one aspect and embodiment of the invention, the resulting optimization fails if the number of bandwidth capacity violations exceeds a specified number of permissible violations.

Figure 10B:
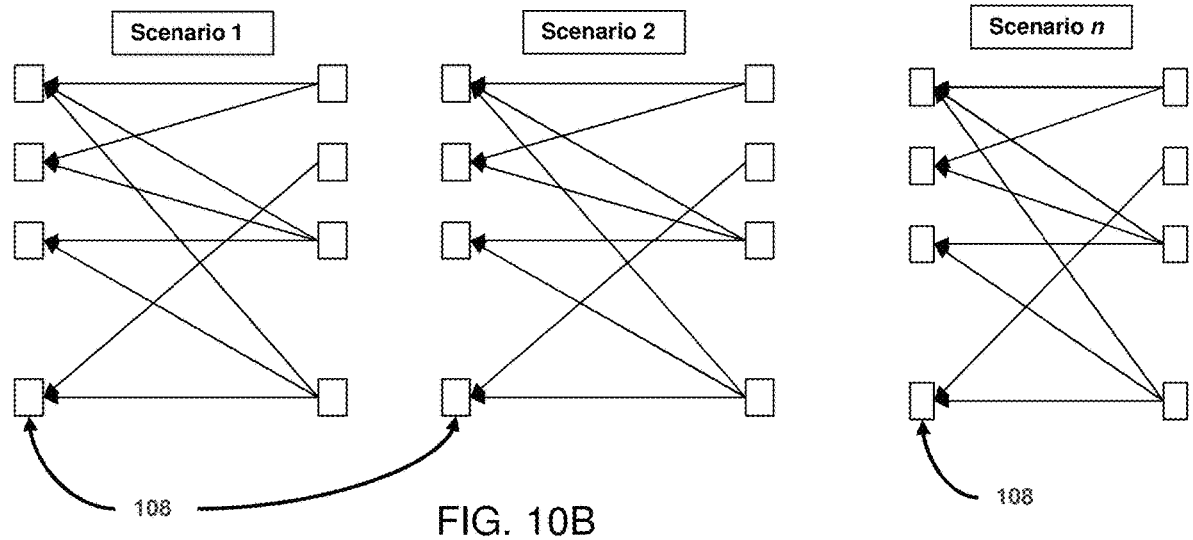
FIG. 10B shows a bandwidth constraint determination for various scenarios in a response network in accordance with the aspects and embodiments of the system.

Referring now to FIG. 10B, three different bandwidth scenarios are shown for the response network. Each path for a pair (sink, source) in the response network, which mirrors the corresponding request network path, has a bandwidth constraint. For example and for simplicity and clarity, paths from all sinks to source 108 are selected and discussed. In scenario 1, one sink's path to source 108 has a 2 GB/sec bandwidth constraint and another sink's path to source 108 has a 1 GB/sec bandwidth constraint. In scenario 2, one sink's path to source 108 has a 1.5 GB/sec bandwidth constraint and the other sink's path has a 1 GB/sec bandwidth constraint. In scenario n, one (sink, source) path has a 1.8 GB/sec bandwidth constraint; the other (sink, source) path has a 1.2 GB/sec bandwidth constraint. The process ensures the response network's bandwidth capacity meets the required bandwidth at every point of the network. In accordance with one aspect and embodiment of the invention, the resulting optimization meets exactly the required bandwidth capacity of the network and at every point. In accordance with one aspect and embodiment of the invention, the resulting optimization fails if the number of bandwidth capacity violations exceeds a specified number of permissible violations.

Figure 11:
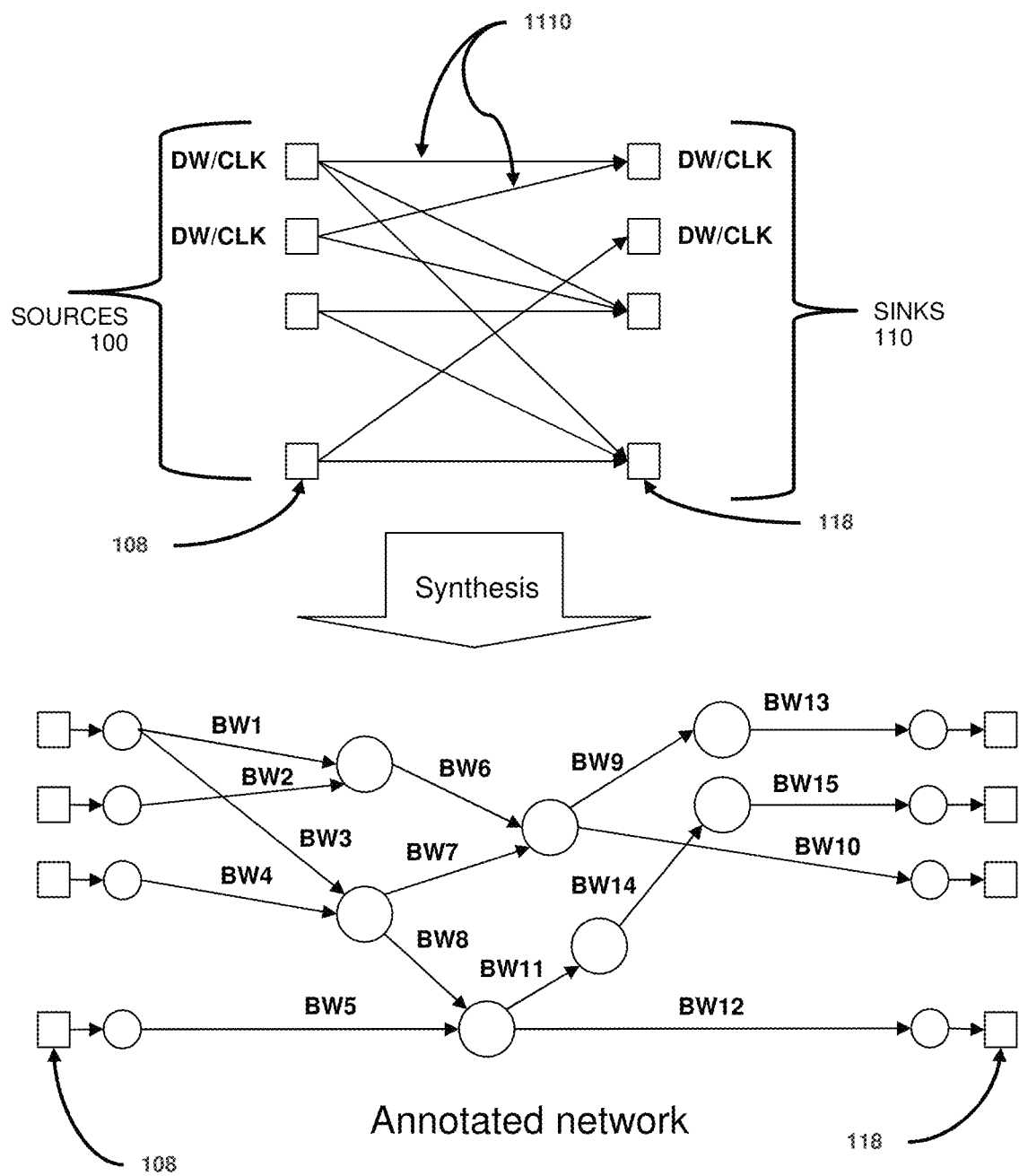
FIG. 11 shows the topology synthesis process of network with annotation for bandwidth throughout the network in accordance with the aspects and embodiments of the invention.

Referring now to FIG. 11, a connectivity map for synthesis of a network having sources 100 and sinks 110 to generate an annotated connectivity map with network elements is shown. For the purpose of illustration with respect to FIG. 11, the paths 1110 are identified. The connectivity map for each (source, sink) pair is shown for all sources 100. The data width and clock for each source is determined. Using the data with and clock for each source, the process determines the network bandwidth at each element and annotates the connectivity map, at each node, with the bandwidth requirement (BW). For example, source 108 communicates with sink 118. The annotated network shows the bandwidth requirements through the elements of the network are BW5 and BW12.

In accordance with the various aspects and embodiment of the invention, the process compute bandwidth capacity at every topology synthesis stage and store it at the edges of the network being built. The circles represent network elements (e.g., switches, mergers, splitters, adapters). The process continues until the network meets the constraints and is admissible. A network is admissible with respect to the performance constraints, if the bandwidth capacity of every edge honors the scenario constraints of required bandwidth at every edge, for every scenario. The process achieves admissibility through computation of the bandwidth based on propagation to determine data width and clock speed.

Figure 12:
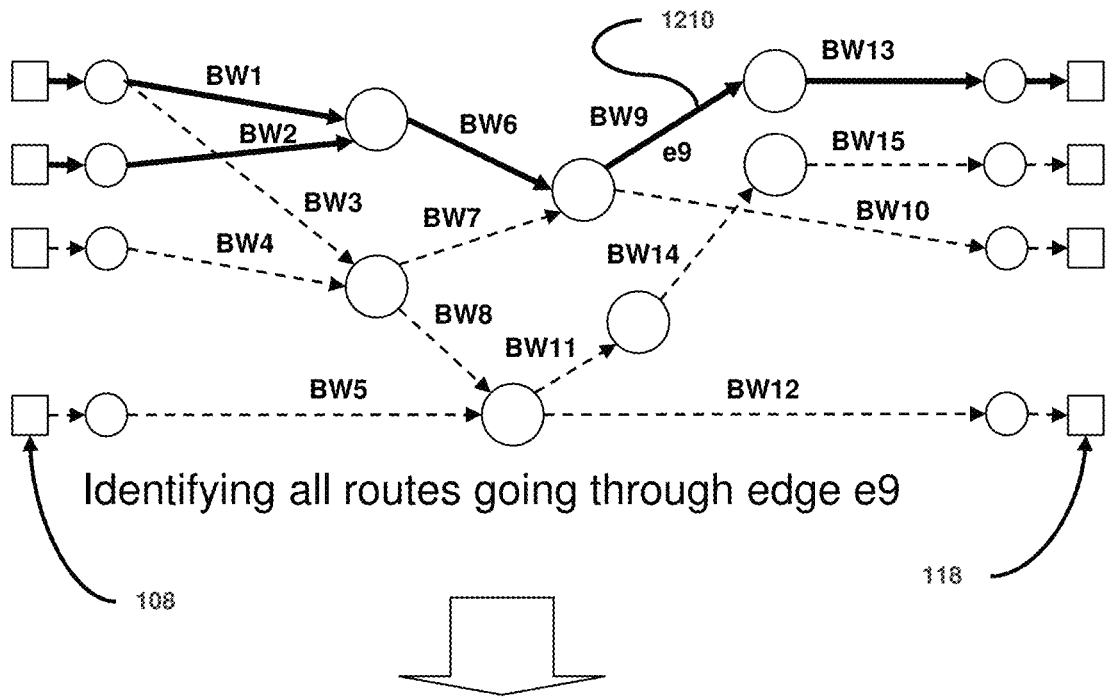
FIG. 12 shows the topology synthesis process for checking the admissibility of any edge's bandwidth in accordance with the aspects and embodiments of the invention.
Figure 12:
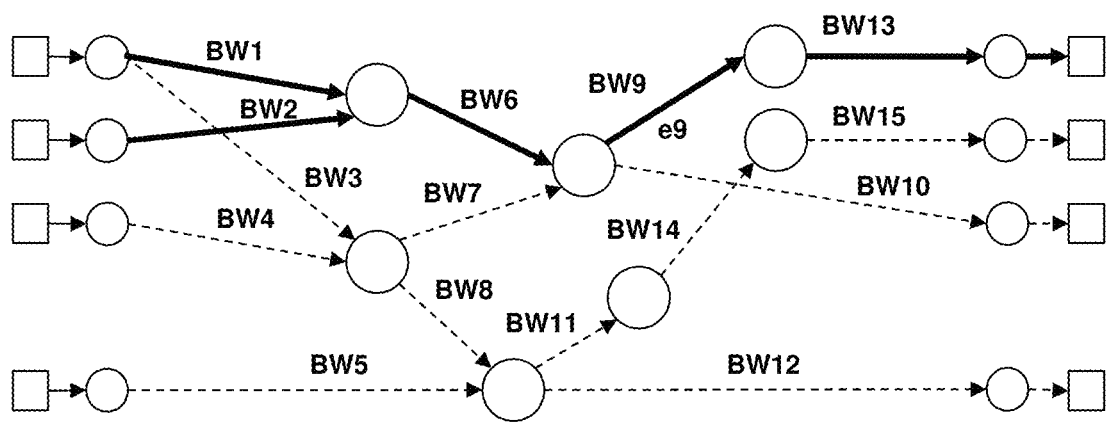

Referring now to FIG. 12, in accordance with the various aspects and embodiments of the invention, the process of checking the admissibility of an edge's bandwidth is shown. For example, edge 1210 (labelled e9) with bandwidth BW9 is the selected edge to be checked. Edge 1210 falls within the paths 1110 of FIG. 11. BW9 is a bandwidth that honors all maximal bandwidth constraints across all scenarios in the mode (write or read) that corresponds to the type of the network being topology synthesized, which is either a request or response network. To identify the constraints to be considered, the process identifies all routes (edges and nodes) going through edge 1210. These are shown in solid line in FIG. 12; the routes that do not pass through edge 1210 are shown in broken line. The process identifies all of the involved connections. The process extracts all the corresponding scenario constraints from the scenario matrices discussed above. The process checks the bandwidth BW9 against the scenario matrices' values. The process ensures that the performance-driven objective, which is considered during network synthesis, includes all bandwidth that are flowing at every edge of the network obeys the scenario constraints while minimizing physical resources.

In accordance with some aspects of the invention, the performance objective can be possibly relaxed by tolerating a margin, under which all bandwidth along the edges need to fall. The margin can be an input to the process. The margin is expressed in percentage, such as 5%, 7%, etc. as a non-limiting example.

In accordance with the various aspects and embodiments of the invention, deviation from the objective (as defined by the user) is measured as maximal deviation, which is the maximal bandwidth deviation across all network edges. In accordance with the various aspects and embodiments of the invention, deviation from the objective (as defined by the user) is measured as an average deviation, which is the average across all network edge bandwidths. The process attempts to find a feasible solution for the bandwidth. If no feasible solution can be found or if the initial scenario constraints are infeasible, then the process generates a list of all violations that is provided to the user. A violation is identified for any edge that is annotated with a bandwidth above a maximal bound of one of the scenarios; this results in the process generating a violation. The violation is raised/reported when the difference between the computed bandwidth and the maximal bound exceeds the specified deviation range.

In accordance with the various aspects and embodiments of the invention, the process checks for bandwidth admissibility at any time to see if a fully annotated network is admissible or not. The process is checking to ensure all edges are honoring the performance constraints. Stated a different way, the process checks the admissibility of all network edges.

In accordance with the various aspects and embodiments of the invention, the process checks for bandwidth admissibility through validating the applied topology synthesis transformations that can be committed and accepted. Stated a different way, the process only checks the part of the network that is impacted by the change. For example, a part of the network may be changed by node clustering.

Figure 13:
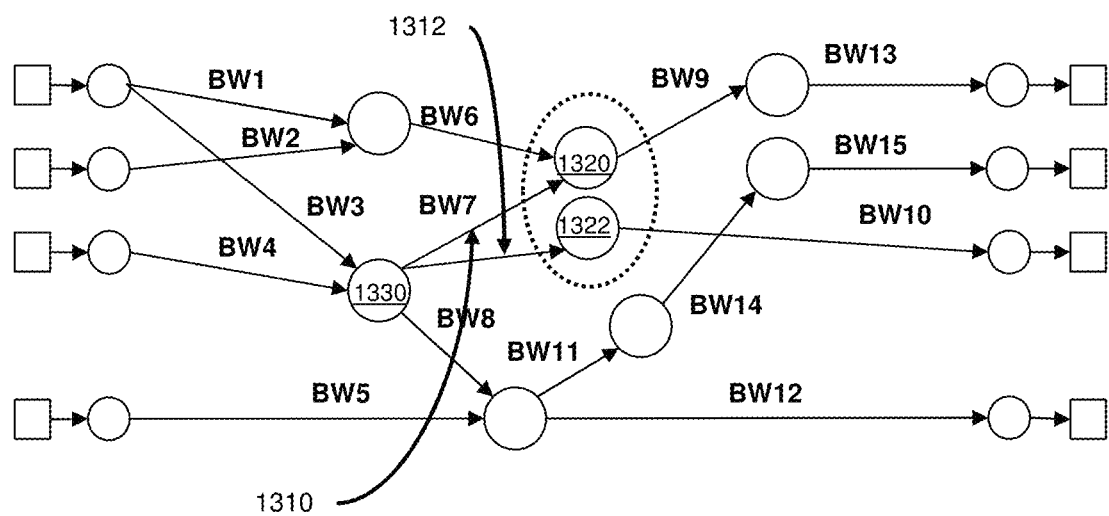
FIG. 13 shows the topology synthesis process for collapsible nodes in accordance with the aspects and embodiments of the invention.
Figure 14:
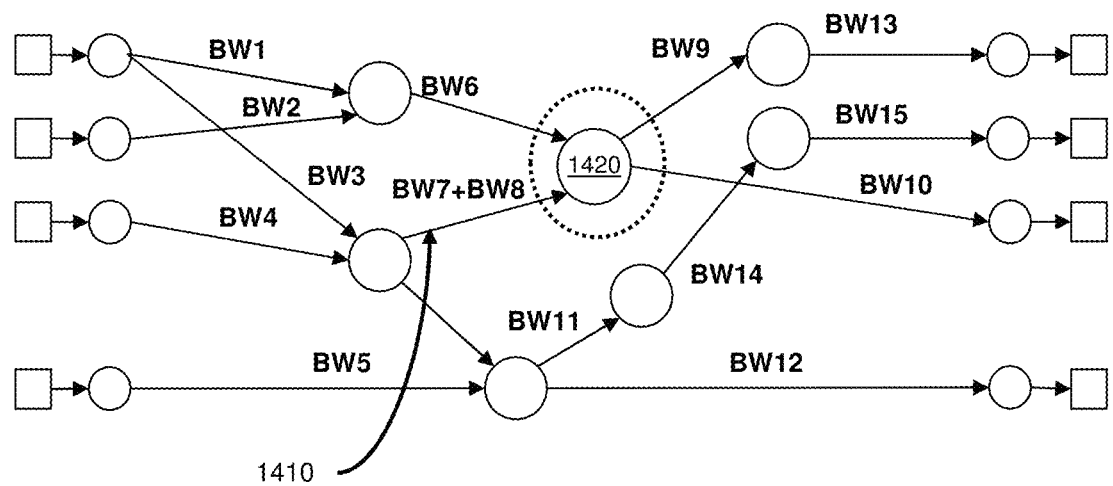
FIG. 14 shows a connectivity map of FIG. 13 in accordance with the aspects and embodiments of the invention.

Referring now to FIG. 13 and FIG. 14, a network is shown for identification of possible clustering of two nodes in accordance with some aspects and embodiments of the invention. Clustering of nodes occurs when at least two nodes are selected to be collapsed into one node. The process uses a checking method to determine if the nodes can be clustered. The process identifies all the edges that are part of the routes that will pass through the new node resulting of the clustering of the two nodes (or that pass through the two old nodes). The nodes 1320 and 1322 are selected to be clustered. In the example of clustering nodes 1320 and 1322, the process identifies edges 1310 and 1312, both of which originate from node 1330, that can be combined because edge 1310 connects to node 1320 and edge 1312 connects to node 1322. Once the nodes 1320 and 1322 are collapsed, the respective edges 1310 and 1312 are also collapsed resulting in edge 1410.

In accordance with various aspects and embodiments of the invention, the process determines, which is for the request network, the bandwidth values for the resulting edge 1410 and all other edges connected to the collapsed nodes 1320 and 1322. For clarity and as a non-limiting example, two edges 1310 and 1312 are considered. Node 1320 has two ingress ports, one of which ingress port has a bandwidth of BW7. Node 1322 has one ingress port with a bandwidth of BW8. In accordance with various aspects and embodiments of the invention, when different edges are to be reduced to one, the bandwidth considered for checking is the combined/sum of the bandwidth of all involved edges. The result of the collapse is node 1420 with a bandwidth of BW7+BW8. When the nodes 1320 and 1322 are collapsed, likewise the edges 1310 and 1312 are merged or combined onto edge 1410 with a combined bandwidth of BW7+BW8. The process determines the routes and identifies the corresponding (source, sink) pair connections. Thus, all the maximal bandwidth bounds from the scenario matrices can be identified. The process checks all identified edges along the identified routes against the limits or bounds of the matrices.

The process can determine and report any violations or deviations. The process also updates the global performance objective (and deviation therefrom) at this point. All topology synthesis transformations, for performance driven node clustering, combines the consideration of physical/floorplan constraints, node/switch size constraints, and performance constraints.

Certain methods according to the various aspects of the invention may be performed by instructions that are stored upon a non-transitory computer readable medium. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code comprising instructions according to various example.

Certain examples have been described herein and it will be noted that different combinations of different components from different examples may be possible. Salient features are presented to better explain examples; however, it is clear that certain features may be added, modified and/or omitted without modifying the functional aspects of these examples as described.

Various examples are methods that use the behavior of either or a combination of machines. Method examples are complete wherever in the world most constituent steps occur. For example and in accordance with the various aspects and embodiments of the invention, IP elements or units include: processors (e.g., CPUs or GPUs), random-access memory (RAM—e.g., off-chip dynamic RAM or DRAM), a network interface for wired or wireless connections such as ethernet, Wi-Fi, 3G, 4G long-term evolution (LTE), 5G, and other wireless interface standard radios. The IP may also include various I/O interface devices, as needed for different peripheral devices such as touch screen sensors, geolocation receivers, microphones, speakers, Bluetooth peripherals, and USB devices, such as keyboards and mice, among others. By executing instructions stored in RAM devices processors perform steps of methods as described herein.

Some examples are one or more non-transitory computer readable media arranged to store such instructions for methods described herein. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments thereof. Elements described herein as coupled have an effectual relationship realizable by a direct connection or indirectly with one or more other intervening elements.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

The scope of the invention, therefore, is not intended to be limited to the exemplary embodiments shown and described herein. Rather, the scope and spirit of present invention is embodied by the appended claims.

What is claimed is:

1. A system comprising:
   memory for storing information and code;
   a processor in communication with the memory;
   a tool for performance-aware topology synthesis of a network, the tool is in communication with the processor and memory, the processor accesses memory to execute the code, which when executed causes the tool to:
   receive, for the network, network information including elements and performance constraints;
   assign each element to a level based on proximity to an intellectual property block to produce a plurality of levels;
   organize, in ascending order based on proximity, the plurality of levels;
   analyze, using the tool, each element at the same level to compute performance data for each element at the same level until all of the plurality of levels have been analyzed;
   store the performance data for each element in memory; and
   set each element's visit flag value to indicate the performance data for the element is stored.

2. The system of claim 1, wherein the elements include nodes and edges that form a route through the network.

3. The system of claim 1, wherein the network is a request network.

4. The system of claim 1, wherein the network is a response network.

5. The system of claim 1, wherein the intellectual property block is a source.

6. The system of claim 1, wherein the intellectual property block is a sink.

7. The system of claim 1, wherein performance data includes data width and clock frequency for each element.

8. The system of claim 7, wherein the data width and clock frequency for each element is used to determine the bandwidth for each element.

9. The system of claim 1, wherein the tool is further caused to:
   check a stagnation flag's value in order to determine if any element's performance data has been changed or remains unchanged; and
   generate, if the stagnation flag's value is true, the performance-aware topology synthesis of the network using the stored performance data.

10. A method for performance-based synthesis of a network, the method comprising:
- receiving, at a tool, network information for the network, wherein the network information includes elements and performance requirements;
- assigning each element in the network to a bucket level based on the element's proximity to an intellectual property block in order to produce a plurality of bucket levels;
- organizing, based on proximity of each element that is part of a route through the network that is used by the intellectual property block to communicate with another intellectual property block, the plurality of bucket levels;
- computing, using the tool, performance data for all elements at a first bucket level selected from the plurality of bucket levels;
- storing each element's performance data with the computed performance data;
- setting a stagnation flag to indicate the values are stored and unchanged for the performance data determined at an initial visit to the first bucket level;
- selecting a next bucket level;
- computing performance data for all elements at the next bucket level;
- storing the performance data for each element at the next bucket level;
- updating the stagnation flag to false if the performance data for any element is updated; and
- generating, if the stagnation flag is true, a performance-aware synthesis of the network.

11. The method of claim 10, wherein elements include nodes and edges that form a route through the network.

12. The method of claim 10, wherein the network handles a request transaction including at least one of: a read transaction and a write transaction.

13. The method of claim 12, wherein the intellectual property block is an initiator.

14. The method of claim 10, wherein the network handles a response transaction.

15. The method of claim 14, wherein the intellectual property block is a target.

16. The method of claim 10, wherein performance data includes data width and clock frequency for each element.

17. The system of claim 16, wherein the data width and clock frequency for each element is used to determine the bandwidth for each element.

* * * * *